United States Patent
Ball

(10) Patent No.: US 6,278,983 B1
(45) Date of Patent: Aug. 21, 2001

(54) AUTOMATED RESOURCE ALLOCATION AND MANAGEMENT SYSTEM

(76) Inventor: Owen Edward Ball, Suite 2021, 3266 Yonge Street, Toronto (CA), M4N 3P6

(*) Notice: Subject to any disclaimer, the term of this patent is extended or adjusted under 35 U.S.C. 154(b) by 0 days.

(21) Appl. No.: 09/227,865

(22) Filed: Jan. 11, 1999

(51) Int. Cl.[7] .................................................. G06F 17/60
(52) U.S. Cl. .............................. 705/39; 705/36; 705/35; 705/1; 705/500
(58) Field of Search .................. 705/39, 36, 35, 705/1, 500

(56) References Cited

U.S. PATENT DOCUMENTS

| | | | |
|---|---|---|---|
| 4,346,442 | 8/1982 | Musmanno | 364/408 |
| 4,376,978 | 3/1983 | Musmanno | 364/408 |
| 4,597,046 | 6/1986 | Musmanno | 364/408 |
| 4,674,044 | 6/1987 | Kalmus et al. | 364/408 |
| 4,700,297 | 10/1987 | Hagel | 364/408 |
| 4,722,055 | 1/1988 | Roberts | 364/408 |
| 4,774,663 | 9/1988 | Musmanno | 364/408 |
| 5,082,275 | 1/1992 | Nilssen | 273/138 |
| 5,083,784 * | 1/1992 | Nilssen | 705/14 |
| 5,202,827 * | 4/1993 | Sober | 705/36 |
| 5,305,200 | 4/1994 | Hartheimer et al. | 364/408 |
| 5,563,783 | 10/1996 | Stolfo et al. | 364/408 |
| 5,689,650 * | 11/1997 | McClelland et al. | 705/36 |
| 5,704,045 * | 12/1997 | King et al. | 705/36 |
| 5,732,400 | 3/1998 | Mandler et al. | 705/26 |
| 5,806,048 * | 9/1998 | Kiron et al. | 705/36 |
| 5,852,811 * | 12/1998 | Atkins | 705/36 |
| 5,864,828 * | 1/1999 | Atkins | 705/36 |
| 5,875,437 * | 2/1999 | Atkins | 705/40 |
| 5,884,285 * | 3/1999 | Atkins | 705/36 |
| 5,911,135 * | 6/1999 | Atkins | 705/36 |
| 5,911,136 * | 6/1999 | Atkins | 705/36 |
| 6,018,722 * | 1/2000 | Ray et al. | 705/36 |

FOREIGN PATENT DOCUMENTS

WO 00/42593 * 7/1996 (WO) .............. G09F/27/00
WO 96/21903 * 7/1996 (WO) .............. G06F/17/60
WO 00/50975 * 8/2000 (WO) .............. G06F/17/60

OTHER PUBLICATIONS

Newman, D. Paul, 'Allocating Internal Audit Resources to Minimize Detection Risk Due to Theft', Auditing, vol. 17, Issue 1, p69, 14p, 1998.*

Raines, J Patrick, 'Financial derivative instruments and social ethics', Journal of Business Ethics; Dordrecht, vol. 13, Issue 3, p. 197, Mar. 1994.*

Guitian, Manuel, 'Conditionality: past, present, future', International Monetary Fund. Staff Papers, vol. 42, Issue 4, p. 792, Dec. 1995.* http://hpef.nersc.gov/accounts/, Dec. 1995.* http://www.athens.ac.uk/info/release3_1 .html.*

* cited by examiner

*Primary Examiner*—Tariq R. Hafiz
*Assistant Examiner*—Akiba Robinson-Boyce
(74) *Attorney, Agent, or Firm*—David S. Thompson

(57) ABSTRACT

An automated resource allocation and management system moves money between an invested fund and an uninvested fund, where the invested fund is typically invested in the stock market and the uninvested fund is typically held in an interest bearing account. In a preferred version, the system is implement by a plurality of software routines running on known data processing hardware. A deposit of money routine provides subroutines which primarily distinguish between whether the deposited money is regular in timing and amount, near in time to an expected transfer from the invested fund to the uninvested fund, near in time to an expected transfer from the uninvested fund to the invested fund, and which otherwise splits the deposit between the invested and uninvested accounts. A buy trigger routine compares the market's performance to a trigger value, and determines whether a transfer from the uninvested account to the invested account is warranted. Similarly, a sell trigger routine compares the market's performance to a trigger value, and determines whether a transfer from the invested account to the uninvested account is warranted.

6 Claims, 5 Drawing Sheets

AUTOMATED RESOURCE ALLOCATION AND MANAGEMENT SYSTEM

CROSS-REFERENCES

There are no applications related to this application filed in this or any foreign country.

BACKGROUND

It is a well-known characteristic of most markets that short-term price fluctuations may be expected. Such fluctuations are typically present even where the long-term trend may result in price movement in substantially one direction. Such price fluctuations may result in part because the market players may disagree on the speed and degree with which the market is moving in the expected direction. As a result, the cumulative total of the day-to-day price increases of a stock, commodity or similar financial instrument, may be large over any give period, relative to the price of the item. However, when offset by the cumulative total of the day-to-day price decreases, the overall shift in price may be relatively modest.

Given such short-term price volatility, it is natural that one may desire to repeatedly enter the market positioned to profit from short-term price movement, and then to timely reposition to benefit from short-term price movement in the opposite direction. Given this natural desire, it may be expected that a number of automated resource allocation and management systems have been developed which attempt to exploit short term price movements in either or both directions. Such automated systems attempt to move in and out of the market in a short-term manner whereby short-term movement in the price may result in gain. Such movements into market and out of the market are generally made with little overall consideration to the long-term direction of the market, and are intended to benefit specifically from short-term price volatility.

A number of automated resource allocation and management systems are known. U.S. Pat. No. 5,563,783 discloses a computer-implemented method and system for securities pool allocation. In this reference, a rule-based greedy algorithm optimizes the allocation of mortgage-backed securities from pools to contracts. U.S. Pat. Nos. 4,346,442, 4,597,046, 4,774,663 and 4,376,978 disclose securities brokerage-cash management systems. U.S. Pat. No. 4,674,044 discloses an automated securities trading system.

What is needed is an automated resource allocation and management system which is adapted for use in a market wherein short-term market volatility provides an opportunity for a correctly-positioned investor to benefit from market movement in both directions over short periods of time. The automated resource allocation and management system must provide for the coordination of the relative levels of investment of several liquid investments, and provide triggers to indicate the need to move capital between the investments to maximize the return from short-term price movement of the various investments.

SUMMARY

The present invention is directed to an apparatus that satisfies the above needs. A novel automated resource allocation and management system is disclosed that is adapted to optimizing the allocation of capital invested between at least two accounts. A preferred version of the system includes the following accounts and operates on known data processing hardware, and provides software routines to execute the following functionality:

(A) A first "invested" account "A" includes units of ownership, such as equity, debt or other instruments, and may include shares of stock or bonds, in a market such as a stock exchange or bond market. The shares or other investment instruments should have a variable value responsive to market conditions.

(B) An "uninvested" account "B", such as an interest bearing savings account or similar investment, includes little or no risk of capital loss and typically provides a low rate of return.

(C) A buy trigger routine, supportable by data processing hardware, executes a transaction wherein money from the uninvested account is transferred to the invested account, resulting in the purchase of stock. The buy-trigger routine is responsive to a buy-indicating price movement in the value of the shares in the first invested account. Typically, a downward price movement that is greater than brokerage costs (typically assumed to be 1%) and less than the average price movement in a given period is a satisfactory trigger.

(D) A sell-trigger routine, supported by data processing hardware, executes a transaction wherein stock from the invested account is sold and the money transferred to the uninvested account. The sell-trigger is responsive to a sell-indicating price movement in the value of the first invested account. Typically, an upward price movement that is greater than the brokerage costs and less than the average price movement in a given period is a satisfactory trigger.

(E) Deposited money is distributed between the first invested account and the uninvested account according to a routine supported by data processing hardware. According to the routine, one of the following is performed:

(a) A first subroutine determines if the deposited money is regular in timing and amount, and if so executes the investment of the deposited money in the first invested account.

(b) If not, a second subroutine determines if the sell-trigger means is about to execute, and if so executes the investment of 25% of the deposited money in the first invested account and 75% of the money in the uninvested account.

(c) If not, a third subroutine determines if the buy-trigger means is about to execute, and if so executes the investment of 75% of the deposited money in the first invested account and 25% of the deposited money in the uninvested account.

(d) If none of the above, a fourth subroutine executes the investment of 50% of the deposited money in the first invested account and 50% of the money in the uninvested account.

(F) A withdrawal from the system is made from the uninvested account.

It is therefore a primary advantage of the present invention to provide a novel automated resource allocation and management system which reduces risk to capital, and which is adapted to any market having some price volatility, whereby prices move in the short term in both directions.

Another advantage of the present invention is to provide a novel automated resource allocation and management system which will provide modest gains even in mild bear markets where the market index falls, and which will provide substantial gains in a bull market.

Another advantage of the present invention is to provide a novel automated resource allocation and management system which allocates deposits of money into the system partly as a function of whether the buy or sell triggers are soon to be activated.

A still further advantage of the present invention is to provide a novel automated resource allocation and management system which is automated and rules-based, and which therefore requires little effort to manage a set of accounts.

DRAWINGS

These and other features, aspects, and advantages of the present invention will become better understood with regard to the following description, appended claims, and accompanying drawings where:

DESCRIPTION

Referring in generally to FIGS. 1 through 4B and to associated TABLES 1A through 3B, the principles of the automated resource allocation and management system may be understood. The allocation system moves money between an invested fund and an uninvested fund, where the invested fund is typically invested in the stock market and the uninvested fund is typically held in an interest bearing account. In a preferred version, the system is implement by a plurality of software routines running on known data processing hardware. A deposit of money routine 20 provides subroutines which primarily distinguish between whether the deposited money is regular in timing and amount, near in time to an expected transfer from the invested fund to the uninvested fund, near in time to an expected transfer from the uninvested fund to the invested fund, and which otherwise splits the deposit between the invested and uninvested accounts. A buy trigger routine 70 compares the market's performance to a trigger value, and determines whether a transfer from the uninvested account to the invested account is warranted. Similarly, a sell trigger routine 80 compares the market's performance to a trigger value, and determines whether a transfer from the invested account to the uninvested account is warranted.

An invested account "A" is typically invested in the stock market or other investment that is liquid and somewhat volatile. The entire fund may be invested in a single stock, a mutual fund or index stock, or other investment.

An uninvested account "B" is typically held in an interest bearing account having no penalty for withdrawal.

Figure 1:
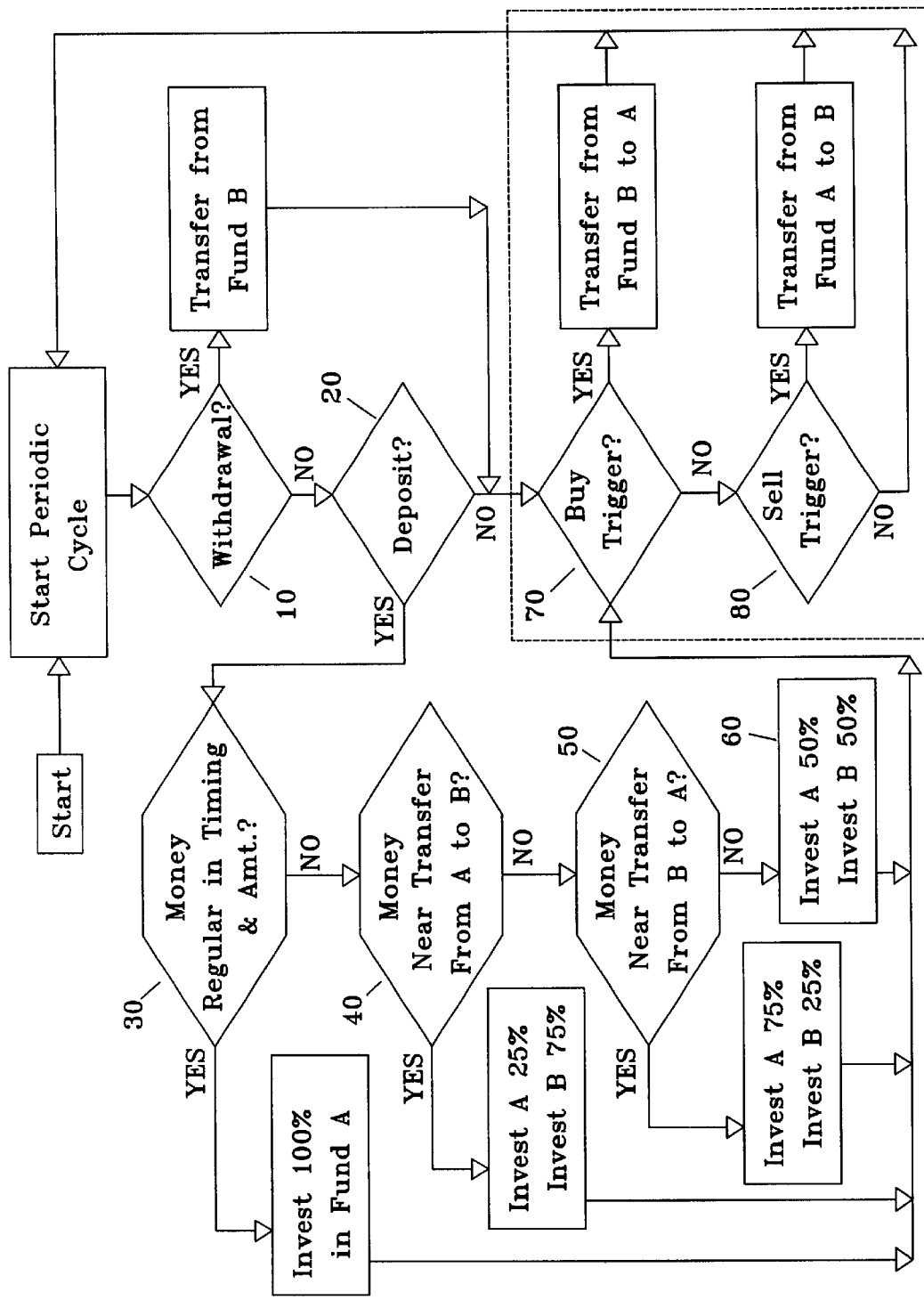
FIG. 1 is a flow chart indicating an overview of the algorithm associated with a version of the automated resource allocation and management system.

Referring to FIG. 1, a withdrawal of money routine 10 is seen. In a preferred embodiment of the system of the invention, the routine 10 transfers requested withdrawal amount, up to 100% of the withdrawn money from the uninvested account "B," where the funds in that account are sufficient. In the case where the amount in the uninvested account "B" is insufficient, funds are withdrawn from the invested fund "A."

Referring particularly to FIG. 1, a deposit of money distribution routine 20 may be seen. This routine recognizes a data entry record indicating that money is to be deposited into the automated resource allocation and management system. Four cases are distinguished in determining where the money will be deposited, i.e. the distribution of the money between the accounts "A" (invested) and "B" (uninvested).

In a first case, where the money is regular in timing and amount, 100% is deposited into the invested account "A." In this circumstance, in a preferred version of the invention, a subroutine 30 recognizes the money as being regular in timing and amount from examination of the deposit and a database of the history of deposits. For example, where data records indicate that $200 has been deposited on or about the first of every month, a further such deposit made on or about the first of the month would be recognized as regular in timing and amount. Alternatively, the investor may simply designate the deposit to be regular in timing and amount where a plan exists to make such deposits regularly. In this first case, the investor takes advantage of the well-known concept of dollar cost averaging by investing 100% of the deposit into the invested account "A." Where the criteria for a deposit that is regular in timing and amount is not present, program control passes to a subroutine 40, which evaluates a second case.

In a second case, a subroutine 40 determines whether the deposit is near in time to an expected trigger of a transfer from the invested account "A" to the uninvested account "B." In a preferred version of the invention, this circumstance results in the deposit being divided, with 25% is deposited in the invested account "A" and 75% deposited in the uninvested account "B." Alternatively, a similar fractional division may be utilized.

The subroutine typically recognizes that a transfer from the invested account to the uninvested account is imminent due to "partial" satisfaction of the conditions required for such a transfer to be executed. For example, where a 3% increase in the market price during a time period is required for a trigger to a transfer from the invested fund "A" to the uninvested fund "B," in a preferred embodiment, a 2% price increase could be sufficient to result in the distribution of the deposit in accordance with the second subroutine, i.e. 25% into account "A" and 75% into account "B." Where the criteria for an imminent trigger for a transfer from account "A" to account "B" is not satisfied, program control passes to the subroutine 50, which evaluates a third case.

In a third case, a subroutine 50 determine whether the deposit is near in time to an expected trigger of a transfer from the uninvested account "B" to the invested account "A." In a preferred version of the invention, this circumstance results in the deposit being divided, with 75% is deposited in the invested account "A" and 25% deposited in the uninvested account "B." Alternatively, a similar fractional division may be utilized.

The subroutine typically recognizes that a transfer from the uninvested account to the invested account is imminent due to "partial" satisfaction of the conditions required for such a transfer to be executed. For example, where a 3% decrease in the market price during a time period is required for a trigger to a transfer from the uninvested fund "B" to the invested fund "A," in a preferred embodiment, a 2% price reduction could be sufficient to result in the distribution of the deposit in accordance with the third subroutine, i.e. 75% into account "A" and 25% into account "B." Where the criteria for an imminent trigger for a transfer from account "B" to account "A" is not satisfied, program control passes to the subroutine 60, which distributes the deposit when the criteria of routines 30, 40 and 50 are not met.

In a fourth case, a subroutine 60 executes an investment of 50% of the deposit into the invested account "A" and 50% of the deposit into the uninvested account "B," in the circumstance where none of the factors triggering the first, second or third subroutines is present.

As seen in FIG. 1, a buy trigger routine 70 is illustrated. The buy trigger routine evaluates market conditions and if certain criteria are met, executes a buy, i.e. a transfer of a percentage, typically 50% of the money from the uninvested fund "B" to the invested fund "A," where the money is used to purchase stock or other investment instruments.

In a preferred embodiment, the criteria is a drop in market price of 3% over a period of time, typically one week or month. Both of these criteria are somewhat flexible. The drop in market price used as a criteria should be greater than the brokerage costs of the trade and should be less than the average historical price change over a period of time equal to the period of time used. For example, where brokerage costs are 1%, the criteria for a buy trigger should be a drop in price greater than 1%.

Similarly, where the average percentage price change, measured from the beginning of one period to the beginning of the next is +/−10%, then the buy trigger should be less than half of that, i.e. less than 5%. Typically, a good choice for the buy trigger is one standard deviation, which might be 3%, and would therefore result in a buy trigger of minus 3%.

In a preferred embodiment, where the buy trigger routine 70 is operated successively, without an intervening operation of the sell trigger routine 80, the buy trigger routine passes a flag to the sell trigger routine which prevents the operation of the sell trigger routine 80 the next time it is called, unless the value triggering it is greater in absolute terms than the first trigger resulting in operation of the first of the preceding buy routine operations.

For example, where the market drops of 4% and 5% at the beginning of two successive periods, the buy routine 70 is executed twice, and the sell routine 80 is not operated. A flag is transferred, from the buy routine 70 to the sell routine 80, indicating that the buy routine has been executed twice in succession, and that the triggering event for the first operation was a 4% drop. The sell routine then prevents its own operation the next time it is next called, unless the market rise triggering the sell routine exceeds 4%.

The sell trigger routine 80 is the "mirror image" of the buy trigger routine 70, in that where the market moves upwardly over a set amount, such as the 3% suggested above, the sell trigger routine 80 will execute a sale of 50% of the assets of the invested fund "A," and a transfer of the resulting cash to the uninvested fund "B." For example, where the trigger was set at 3%, as suggested, a 3% or greater rise in the market price would result in the sell trigger routine executing the sale and transfer of assets to the uninvested fund "B."

It is typically the case that the percentage decrease which triggers the buy routine 70 and the percentage increase which triggers the sell routine 80 be the negative of each other. For example, where a −3% move (i.e. decrease) triggers the buy routine 70 a +3% move (i.e. increase) triggers the sell routine 80. Alternatively, the buy and sell triggers may be altered somewhat, to adapt to a specific application.

TABLE 1A

| Example 1 | Account A | Account B | Total | Index change | Index Value |
|---|---|---|---|---|---|
| Start Values | 5,000.00 | 5,000.00 | 10,000.00 | — | 5,000.00 |
| Period 1 | 7,225.00 | 2,500.00 | 9,725.00 | −5 | 4,750.00 |
| Period 2 | 7,297.25 | 2,500.00 | 9,797.25 | 1 | 4,797.50 |
| Period 3 | 3,758.08 | 6,220.50 | 9,978.59 | 3 | 4,941.425 |
| Period 4 | 6,724.49 | 3,110.25 | 9,834.74 | −3 | 4,793.182 |
| Period 5 | 3,597.60 | 6,671.88 | 10,269.48 | 7 | 5,128.705 |
| Period 6 | 3,669.55 | 6,671.88 | 10,341.43 | 2 | 5,231.279 |
| Period 7 | 6,825.35 | 3,335.94 | 10,161.29 | −4 | 5,022.028 |
| Period 8 | 3,549.18 | 6,849.63 | 10,398.81 | 4 | 5,222.909 |
| Period 9 | 3,478.20 | 6,849.63 | 10,327.83 | −2 | 5,118.451 |
| Period 10 | 6,764.42 | 6,907.14 | 10,189.23 | −3 | 4,964.897 |

TABLE 1B

| Example 2 | Account A | Account B | Total | Index change | Index Value |
|---|---|---|---|---|---|
| Start Values | 5,000.00 | 5,000.00 | 10,000.00 | — | 5,000.00 |
| Period 1 | 2,625.00 | 7,598.75 | 10,223.75 | 5 | 5,250.00 |
| Period 2 | 2,598.75 | 7,598.75 | 10,197.50 | −1 | 5,197.50 |
| Period 3 | 6,282.17 | 3,799.38 | 10,081.54 | −3 | 5,041.575 |
| Period 4 | 3,235.32 | 7,002.34 | 10,237.66 | 3 | 5,192.822 |
| Period 5 | 6,475.00 | 3,501.17 | 9,976.17 | −7 | 4,829.325 |
| Period 6 | 6,345.50 | 3,501.17 | 9,846.67 | −2 | 4,732.738 |
| Period 7 | 3,299.66 | 6,767.83 | 10,067.50 | 4 | 4,922.048 |
| Period 8 | 6,517.75 | 3,383.92 | 9,901.67 | −4 | 4,725.166 |
| Period 9 | 6,648.11 | 3,383.92 | 10,032.02 | 2 | 4,819.669 |
| Period 10 | 3,423.78 | 6,773.45 | 10,197.23 | 3 | 4,964.259 |

Figure 2A:
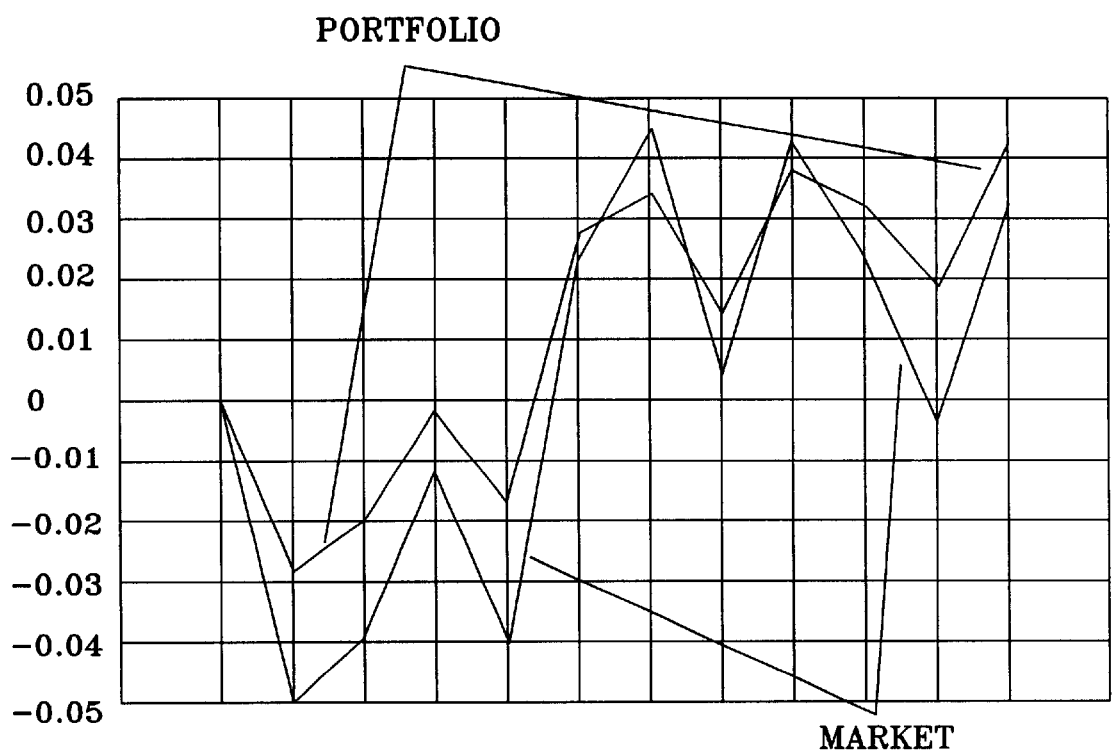
FIG. 2A is a graphical view of a market, taken over ten periods of time in which the annualized % index growth was 15.23 percent, and in which the annualized % portfolio growth was 19.70 percent.
Figure 2B:
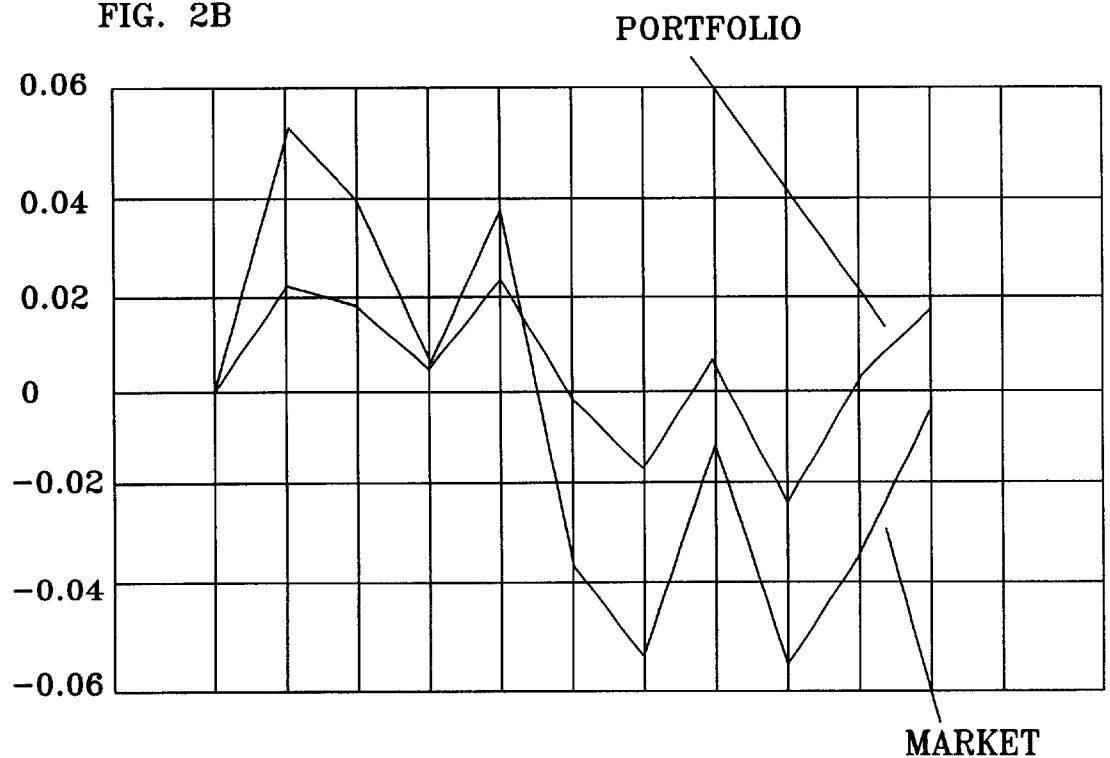
FIG. 2B is a graphical view of a market, taken over ten periods of time in which the annualized % index growth was −3.73 percent, and in which the annualized % portfolio growth was 10.17 percent.
Figure 3A:
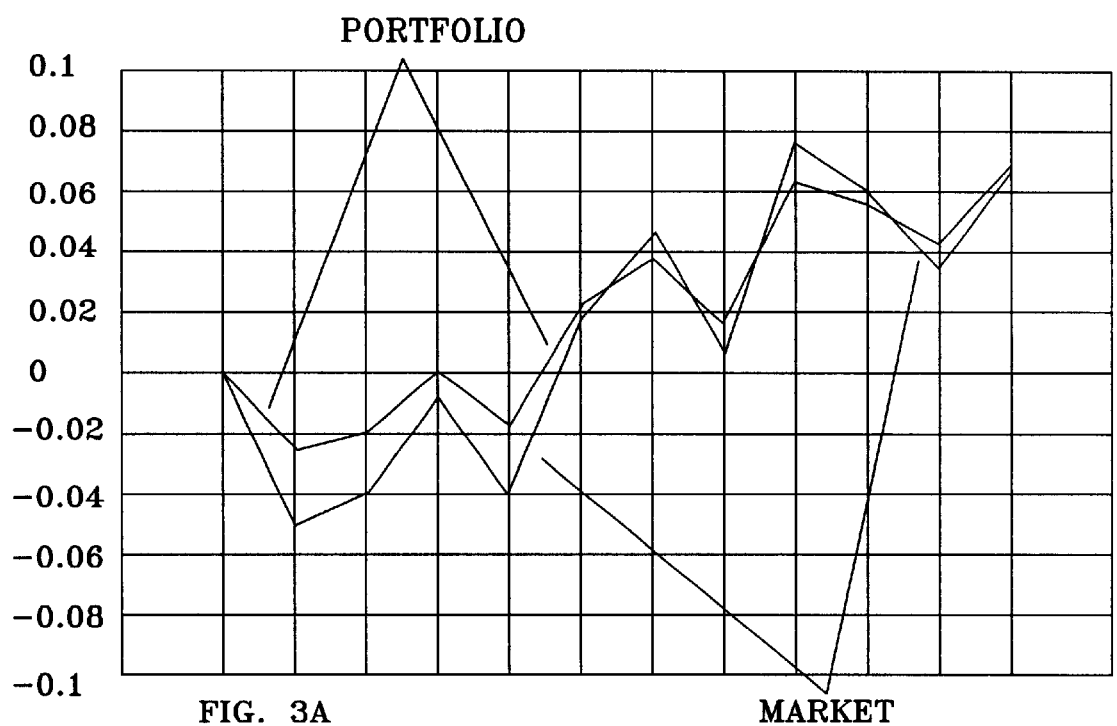
FIG. 3A is a graphical view of a market, taken over ten periods of time in which the annualized % index growth was 33.16 percent, and in which the annualized % portfolio growth was 31.89 percent.
Figure 3B:
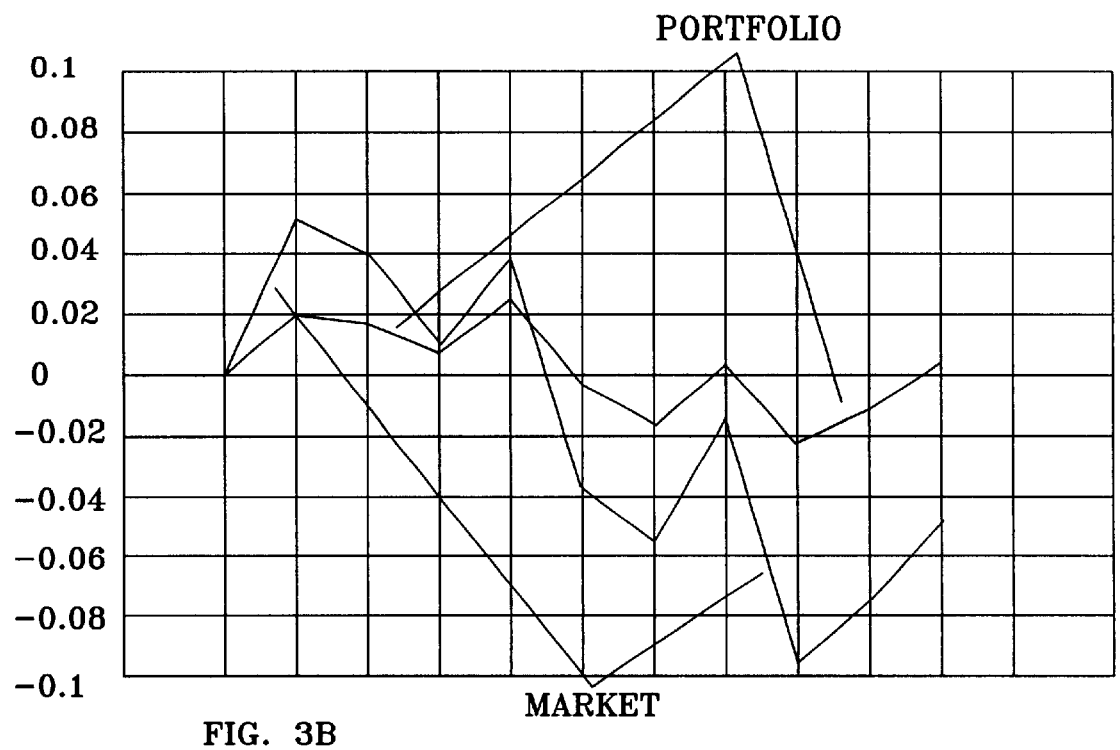
FIG. 3B is a graphical view of a market, taken over ten periods of time in which the annualized % index growth was −25.80 percent, and in which the annualized % portfolio growth was 3.07 percent.
Figure 4A:
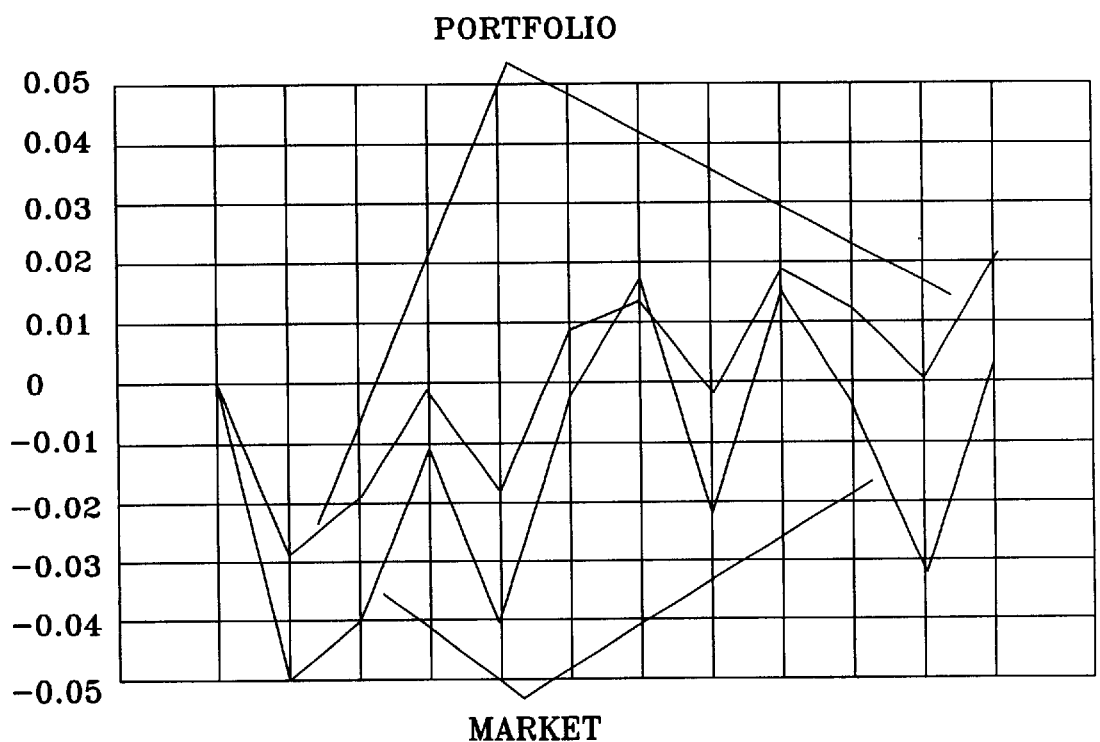
FIG. 4A is a graphical view of a market, taken over ten periods of time in which the annualized % index growth was 1.77 percent, and in which the annualized % portfolio growth was 10.35 percent.
Figure 4B:
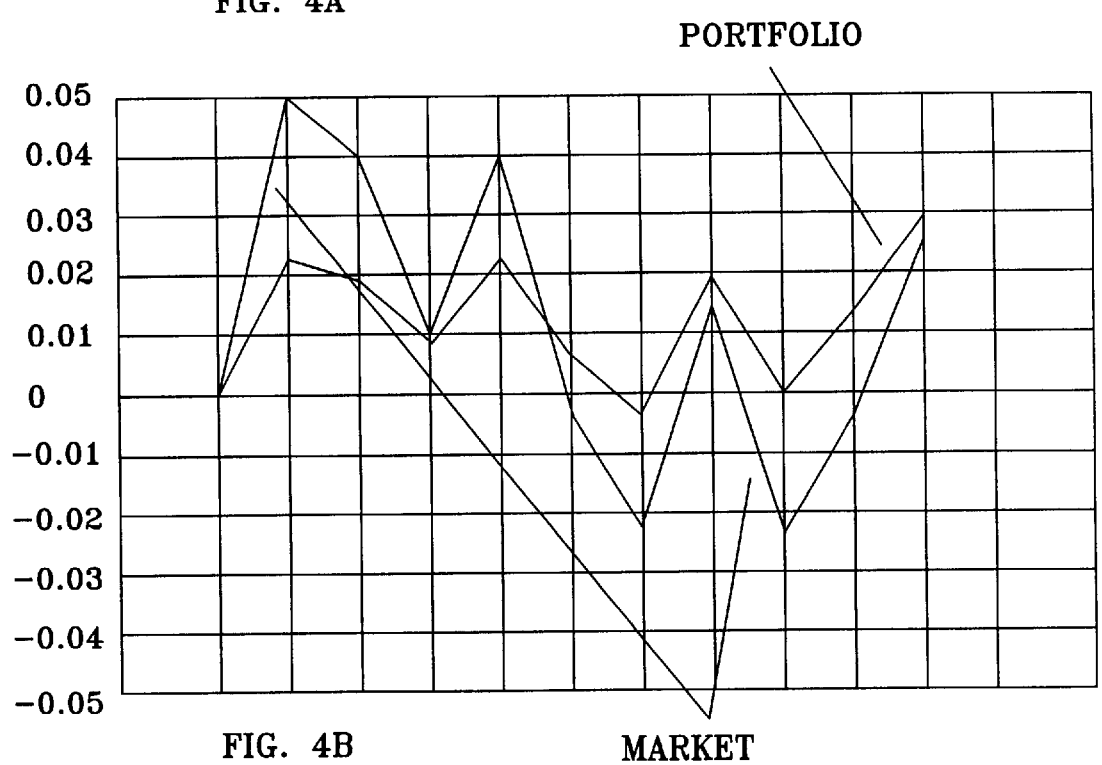
FIG. 4B is a graphical view of a market, taken over ten periods of time in which the annualized % index growth was 12.79 percent, and in which the annualized % portfolio growth was 15.23 percent.

Tables 1A and 1B represent the data used in FIGS. 2A and 2B; tables 2A and 2B represent the data used in FIGS. 3A and 3B; tables 3A and 3B represent the data used in FIGS. 4A and 4B. Referring primarily to the numerical data in tables 1A and 1B, it can be seen that the market index changes in one table are the negative of the other table, e.g. where the first index change corresponding to the first period is minus 5% in table 1A, it is plus 5% in table 1B. The market index, starting with $5000 ends at $4964. The invested account and uninvested accounts, starting at a combined value of $10,000 end at $10,189 in table 1A and $10,197 in table 1B. Therefore, even though the market went down in both cases in tables 1A and 1B, the automated resource allocation and management system produced a gain in both circumstances by taking advantage of short term gains.

TABLE 2A

| Example 3 | Account A | Account B | Total | Index change | Index Value |
|---|---|---|---|---|---|
| Start Values | 5,000.00 | 5,000.00 | 10,000.00 | — | 5,000.00 |
| Period 1 | 7,225.00 | 2,500.00 | 9,725.00 | −5 | 4,750.00 |
| Period 2 | 7,297.25 | 2,500.00 | 9,797.25 | 1 | 4,797.50 |

TABLE 2A-continued

| Example 3 | Account A | Account B | Total | Index change | Index Value |
|---|---|---|---|---|---|
| Period 3 | 3,758.08 | 6,220.50 | 9,978.59 | 3 | 4,941.425 |
| Period 4 | 6,724.49 | 3,110.25 | 9,834.74 | −3 | 4,793.182 |
| Period 5 | 3,597.60 | 6,671.88 | 10,269.48 | 7 | 5,128.705 |
| Period 6 | 3,669.55 | 6,671.88 | 10,341.43 | 2 | 5,231.279 |
| Period 7 | 6,825.35 | 3,335.94 | 10,161.29 | −4 | 5,022.028 |
| Period 8 | 3,685.69 | 6,984.77 | 10,670.46 | 8 | 5,423.790 |
| Period 9 | 3,611.98 | 6,984.77 | 10,596.75 | −2 | 5,315.314 |
| Period 10 | 6,961.08 | 3,492.39 | 10,453.46 | −3 | 5,155.855 |

TABLE 2B

| Example 4 | Account A | Account B | Total | Index change | Index Value |
|---|---|---|---|---|---|
| Start Values | 5,000.00 | 5,000.00 | 10,000.00 | — | 5,000.00 |
| Period 1 | 2,625.00 | 7,598.75 | 10,223.75 | 5 | 5,250.00 |
| Period 2 | 2,598.75 | 7,598.75 | 10,197.50 | −1 | 5,197.50 |
| Period 3 | 6,282.17 | 3,799.38 | 10,081.54 | −3 | 5,041.575 |
| Period 4 | 3,235.32 | 7,002.34 | 10,237.66 | 3 | 5,192.822 |
| Period 5 | 6,475.00 | 3,501.17 | 9,976.17 | −7 | 4,829.325 |
| Period 6 | 6,345.50 | 3,501.17 | 9,846.67 | −2 | 4,732.738 |
| Period 7 | 3,299.66 | 6,767.83 | 10,067.50 | 4 | 4,922.048 |
| Period 8 | 6,385.77 | 3,383.92 | 9,769.68 | −8 | 4,528.284 |
| Period 9 | 6,513.48 | 3,383.92 | 9,897.40 | 2 | 4,618.850 |
| Period 10 | 3,354.44 | 6,704.82 | 10,059.26 | 3 | 4,757.415 |

Referring to tables 2A and 2B, it can be seen that the market goes up in table 2A, resulting in significant gain in the combined accounts A and B. In table 2B, using the negative of the index change, the market went down significantly, but the combined accounts A and B when up modestly.

TABLE 3A

| Example 5 | Account A | Account B | Total | Index change | Index Value |
|---|---|---|---|---|---|
| Start Values | 5,000.00 | 5,000.00 | 10,000.00 | — | 5,000.00 |
| Period 1 | 7,225.00 | 2,500.00 | 9,725.00 | −5 | 4,750.00 |
| Period 2 | 7,297.25 | 2,500.00 | 9,797.25 | 1 | 4,797.50 |
| Period 3 | 3,758.08 | 6,220.50 | 9,978.59 | 3 | 4,941.425 |
| Period 4 | 6,724.49 | 3,110.25 | 9,834.74 | −3 | 4,793.182 |
| Period 5 | 3,496.73 | 6,572.02 | 10,068.75 | 4 | 4,984.910 |
| Period 6 | 3,566.67 | 6,572.02 | 10,138.69 | 2 | 5,084.608 |
| Period 7 | 6,677.15 | 3,286.01 | 9,963.16 | −4 | 4,881.223 |
| Period 8 | 3,472.12 | 6,723.41 | 10,195.53 | 4 | 5,076.472 |
| Period 9 | 3,402.68 | 6,723.41 | 10,126.08 | −2 | 4,974.943 |
| Period 10 | 6,628.68 | 3,361.70 | 9,990.39 | −3 | 4,825.695 |

TABLE 3B

| Example 6 | Account A | Account B | Total | Index change | Index Value |
|---|---|---|---|---|---|
| Start Values | 5,000.00 | 5,000.00 | 10,000.00 | — | 5,000.00 |
| Period 1 | 2,625.00 | 7,598.75 | 10,223.75 | 5 | 5,250.00 |
| Period 2 | 2,598.75 | 7,598.75 | 10,197.50 | −1 | 5,197.50 |
| Period 3 | 6,282.17 | 3,799.38 | 10,081.54 | −3 | 5,041.575 |
| Period 4 | 3,235.32 | 7,002.34 | 10,237.66 | 3 | 5,192.822 |
| Period 5 | 6,572.06 | 3,501.17 | 10,073.23 | −4 | 4,985.109 |
| Period 6 | 6,440.62 | 3,501.17 | 9,941.79 | −2 | 4,885.407 |
| Period 7 | 3,349.12 | 6,816.80 | 10,165.92 | 4 | 5,080.823 |
| Period 8 | 6,589.47 | 3,408.40 | 9,997.87 | −4 | 4,877.591 |
| Period 9 | 6,721.26 | 3,408.40 | 10,129.66 | 2 | 4,975.142 |
| Period 10 | 3,461.45 | 6,835.24 | 10,296.69 | 2 | 5,124.397 |

Referring to tables 3A and 3B, it can be seen that the market goes down in table 3A but up in table 3B, where the indexes are reversed in sign. Where the market went down in table 3A, the combined accounts A and B out performed the market. Where the market went up in table 3B the combined accounts A and B exceeded the markets percentage gain.

The above examples illustrate that the automated resource allocation and management system tends to result in a significant improvement over the market's performance while reducing risk.

Figure 1A:
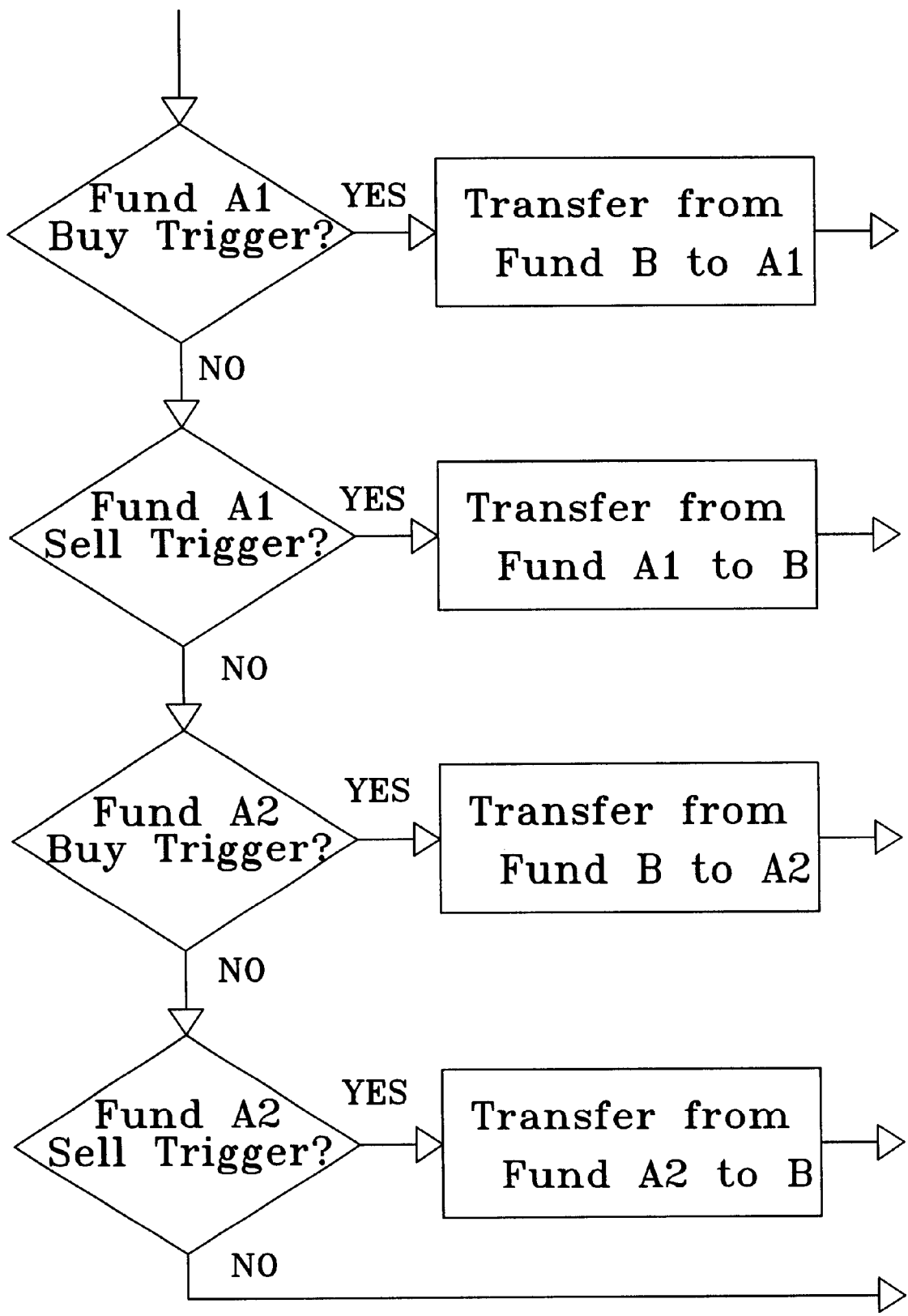
FIG. 1A is a generalization of the portion of FIG. 1 seen in a dotted outline, illustrating use of a number of invested funds, whereby FIG. 1A could be substituted for the material within the dotted ouline of FIG. 1.

As seen in FIG. 1A, the system of the invention is adaptable to more than one invested account. In FIG. 1A, a plurality of invested accounts A1, A2, etc., could be provided. Each account could represent an investment in a different stock, mutual fund or other investment.

Once per period of time, typically weekly, the system illustrated in FIG. 1 is operated. Withdrawals and the distribution of incoming deposits are executed by routines 10, 20, 30, 40, 50, 60, if circumstances require. The buy and sell trigger routines 70, 80 evaluate market conditions to determine which, if either, should execute instructions.

The period of time between operation of the system seen in FIG. 1 is dependent on the historical volatility of the market. For example, where an average market movement of 10% per period is desired, the period will have to be selected accordingly. As a result, some stocks may suggest a longer or shorter period than others, due to differences in the volatility of their prices.

The previously described versions of the present invention have many advantages, including a primary advantage of providing a novel automated resource allocation and management system which reduces risk to capital, and which is adapted to any market having some price volatility, whereby prices move in the short term in both directions.

Another advantage of the present invention is to provide a novel automated resource allocation and management system which will provide modest gains even in mild bear markets where the market index falls, and which will provide substantial gains in a bull market.

A still further advantage of the present invention is to provide a novel automated resource allocation and management system which is automated and rules-based, and which therefore requires little effort to manage a set of accounts.

Another advantage of the present invention is to provide a novel automated resource allocation and management system which allocates deposits of money into the system partly as a function of whether the buy or sell triggers are soon to be activated.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while preferred distribution values for deposited money have been disclosed, alternate distribution amounts and percentages could be made to the invested and uninvested accounts. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data processing system for administering at least two accounts to allocate resources between the at least two accounts, the processing system comprising:
   (A) a first invested account comprising units of ownership in a market having a variable value, wherein the value of the units of ownership is variable in price responsive to market conditions;
   (B) an uninvested account;
   (C) buy-trigger means, responsive to a buy-indicating price movement in the value of the units of ownership in the first invested account, for triggering the purchase of additional units of ownership in the first invested account, using capital from the uninvested account, the buy-trigger means conforming to criteria comprising:
      (a) wherein a change in the price of the first invested account is a drop in price over a period of time; and
      (b) wherein the drop in price of the first invested account over the period of time is greater than one-half of an average change in price over time; and
   (D) sell-trigger means, responsive to a sell-indicating price movement in the value of the units of ownership in the first invested account, for triggering the sale of units of ownership in the first invested account, and for transferring the capital to the uninvested account, the sell-trigger means conforming to criteria comprising:
      (a) wherein a change in the price of the first invested account is an increase in price over a period of time;
      (b) wherein the increase in price of the first invested account over the the period of time is greater than one-half of an average change in price over time.

2. The data processing system of claim 1, further comprising:
   (A) deposit of money distribution means, in communication with the buy-trigger means and the sell-trigger means, for distributing a deposit of money between the first invested account and the uninvested account, comprising:
      (a) first means for determining if the deposited money is regular in timing and amount, and if so for investing the deposited money in the first invested account, and if not for triggering
      (b) second means for determining if the sell-trigger means is about to execute, and if so for investing 25% of the deposited money in the first invested account and 75% of the money in the uninvested account, and if not for triggering
      (c) third means for determining if the buy-trigger means is about to execute, and if so for investing 75% of the deposited money in the first invested account and 25% of the deposited money in the uninvested account, and if not for triggering
      (d) fourth means for investing 50% of the deposited money in the first invested account and 50% of the money in the uninvested account.

3. The data processing system of claim 1, wherein the buy-trigger means is responsive to a reduction in the value of the units of ownership in the first invested account of 3% in one week.

4. The data processing system of claim 1, wherein the sell-trigger means is responsive to an increase in the value of the units of ownership in the first invested account of 3% in one week.

5. The data processing system of claim 2, wherein the first means accesses a database to determine if the deposited money is regular in timing and amount.

6. A data processing system for administering at least two accounts to allocate resources between the at least two accounts, the processing system comprising:
   (A) a first invested account comprising units of ownership in a market having a variable value, wherein the value of the units of ownership is variable in price responsive to market conditions;
   (B) an uninvested account;
   (C) buy-trigger means, responsive to a buy-indicating price movement in the value of the units of ownership in the first invested account, for triggering the purchase of additional units of ownership in the first invested account, using 50% of the capital from the uninvested account, the buy-trigger means conforming to criteria comprising:
      (a) wherein a change in the price of the first invested account is a drop in price over the a period of time; and
      (b) wherein the drop in price of the first invested account over the the period of time is greater than one-half of an average change in price over the period of time; and
   (D) sell-trigger means, responsive to a sell-indicating price movement in the value of the units of ownership in the first invested account, for triggering the sale of 50% of the units of ownership in the first invested account, and for transferring the capital to the uninvested account, the sell-trigger means conforming to criteria comprising:
      (a) wherein a change in the price of the first invested account is an increase in price over the a period of time;
      (b) wherein the increase in price of the first invested account over the the period of time is greater than one-half of an average change in price over the period of time;
      (c) but wherein, in the event that the buy-trigger means is operated a first time and a second time, successively and without an intervening operation of the sell-trigger means, the sell-trigger means does not operate unless the increase in price of the first invested account is greater in absolute terms than the change in the price of the first invested account the first time; and
      (d) but wherein, in the event that the sell-trigger means is operated a first instance and a second instance, successively and without an intervening operation of the buy-trigger means, the buy-trigger means does not operate unless the decrease in price of the first invested account is greater in absolute terms than the change in the price of the first invested account in the first instance;
   (E) deposit of money distribution means, in communication with the buy-trigger means and the sell-trigger means, for distributing the deposited money between the first invested account and the uninvested account, comprising:
      (a) first means, in communication with a database, for determining if the deposited money is regular in timing and amount, and if so for investing the deposited money in the first invested account, and if not for triggering:

(b) second means for determining if the sell-trigger means is about to execute, and if so for investing less than half of the deposited money in the first invested account and the remainder of the money in the uninvested account, and if not for triggering:

(c) third means for determining if the buy-trigger means is about to execute, and if so for investing more than half of the deposited money in the first invested account and the remainder of the deposited money in the uninvested account, and if not for triggering:

(d) fourth means for investing approximately half of the deposited money in the first invested account and the remainder of the money in the uninvested account.

* * * * *